(12) United States Patent
Mukhopadhyay et al.

(10) Patent No.: US 8,643,973 B2
(45) Date of Patent: Feb. 4, 2014

(54) METHOD AND APPARATUS FOR REFLECTION CANCELLATION

(75) Inventors: Rajarshi Mukhopadhyay, Allen, TX (US); Scott G. Sorenson, Lakeville, MN (US); Marco Corsi, Parker, TX (US); Paul M. Emerson, Murphy, TX (US)

(73) Assignee: Texas Instruments Incorporated, Dallas, TX (US)

( * ) Notice: Subject to any disclaimer, the term of this patent is extended or adjusted under 35 U.S.C. 154(b) by 275 days.

(21) Appl. No.: 13/281,278

(22) Filed: Oct. 25, 2011

(65) Prior Publication Data

US 2013/0100551 A1  Apr. 25, 2013

(51) Int. Cl.
*G11B 5/02* (2006.01)

(52) U.S. Cl.
USPC .................................. 360/68; 360/46; 360/67

(58) Field of Classification Search
None
See application file for complete search history.

(56) References Cited

U.S. PATENT DOCUMENTS

| | | | |
|---|---|---|---|
| 5,534,812 A * | 7/1996 | Cao et al. | 327/333 |
| 5,838,193 A * | 11/1998 | Myers et al. | 330/10 |
| 6,121,800 A * | 9/2000 | Leighton et al. | 327/110 |
| 6,256,161 B1 * | 7/2001 | Leighton et al. | 360/67 |
| 6,294,942 B2 * | 9/2001 | Bertin et al. | 327/327 |
| 6,879,455 B2 * | 4/2005 | Ngo et al. | 360/68 |
| 6,879,456 B2 * | 4/2005 | Leighton et al. | 360/68 |
| 7,005,903 B2 * | 2/2006 | Chan et al. | 327/170 |
| 7,292,074 B2 * | 11/2007 | Barnett et al. | 327/110 |
| 7,373,114 B2 * | 5/2008 | Yagyu et al. | 455/78 |
| 7,375,909 B2 * | 5/2008 | Venca et al. | 360/46 |
| 7,619,843 B2 * | 11/2009 | Contreras et al. | 360/46 |
| 7,635,998 B1 * | 12/2009 | Taki | 327/108 |
| 7,863,946 B2 * | 1/2011 | Ozasa | 327/108 |
| 7,941,105 B1 | 5/2011 | McCall et al. | |
| 8,108,710 B2 * | 1/2012 | Zabinski | 713/503 |
| 2003/0076613 A1 * | 4/2003 | Ngo et al. | 360/68 |
| 2004/0032682 A1 | 2/2004 | Leighton et al. | |
| 2005/0078963 A1 | 4/2005 | Lenosky | |
| 2006/0119970 A1 * | 6/2006 | Hayashi et al. | 360/68 |
| 2006/0158225 A1 | 7/2006 | Stojanovic et al. | |

* cited by examiner

*Primary Examiner* — Dismery Mercedes
(74) *Attorney, Agent, or Firm* — John R. Pessetto; Wade J. Brady, III; Frederick J. Telecky, Jr.

(57) ABSTRACT

A method for calibrating a reflection compensator is provided. A delay is initially set to a predetermined minimum, and an input pulse is transmitted across a transmission line. A compensation current is then applied after the delay. The reflection from the transmission line is digitized to generate a measurement, and a determination is made as to whether the compensation current substantially compensates for the reflection. If the compensation current does not substantially compensate for the reflection, then the delay is adjusted, and the process is repeated until the compensation current substantially compensates for the reflection.

6 Claims, 6 Drawing Sheets

METHOD AND APPARATUS FOR REFLECTION CANCELLATION

TECHNICAL FIELD

The invention relates generally to impedance matching and, more particularly, to reflection cancellation.

BACKGROUND

Turning to FIG. 1, an example of a conventional writing system 100 for a hard disc drive (HDD) can be seen. As shown, a write driver 102 (having an impedance $Z_O$) is coupled to a magnetic head 108 over interconnects 104 and 106. With this arrangement, the write driver 102 generates a current pulse that is shaped to cause at the magnetic head 108 to "write" data (i.e., bit) to an HDD platter. A problem with this arrangement, however, is that impedance matching between the write driver 102 and interconnects 104 and 106 can be difficult, and, as a result of having an impedance mismatch, a reflection current can distort the current signal generated by the write driver 102 (as shown in FIG. 2). Therefore, there is a need for a write driver that compensates for current reflections.

An example of a conventional system is U.S. Pat. No. 7,373,114.

SUMMARY

A preferred embodiment of the present invention, accordingly, provides an apparatus. The apparatus comprises a transmission terminal; a transmitter that is coupled to the transmission terminal; and a compensator having: a reflection cancellation driver that is coupled to the transmission terminal, wherein the reflection cancellation driver injects a current at a delay; a reflection sensor that is coupled to the transmission terminal; a predriver that is coupled to the reflection cancellation driver and the reflection sensor, wherein, in a calibration mode, the reflection cancellation predriver iteratively adjusts the delay to determine a compensation delay, wherein the current provided at the compensation delay substantially compensates for a reflection current received by the transmission terminal.

In accordance with an embodiment of the present invention, the transmitter further comprises: the predriver; and a transmission driver that is coupled between the predriver and the transmission terminal.

In accordance with an embodiment of the present invention, the reflection cancellation circuit further comprises: a first adjustable current source that is coupled to the transmission terminal; and a second adjustable current source that is coupled the transmission terminal, wherein the first and second adjustable current sources are controlled by the predriver.

In accordance with an embodiment of the present invention, the transmission terminal further comprises a first transmission terminal and a second transmission terminal, and wherein the transmission driver further comprises a first transmission driver that is coupled to the first transmission terminal and a second transmission driver that is coupled to the second transmission terminal, and wherein the reflection cancellation circuit further comprises a first reflection cancellation circuit that is coupled to the first transmission terminal and a second reflection cancellation circuit that is coupled to the second transmission terminal.

In accordance with an embodiment of the present invention, the reflection sensor further comprises: a differential amplifier that is coupled across the first and second transmission terminals; and an analog-to-digital converter (ADC) that is coupled between the differential amplifier and the predriver.

In accordance with an embodiment of the present invention, the reflection sensor further comprises a sampling circuit that is coupled to between differential amplifier and the ADC.

In accordance with an embodiment of the present invention, the reflection sensor further comprises logic that is coupled between the predriver and the sampling circuit.

In accordance with an embodiment of the present invention, the logic further comprises: a delay circuit that is coupled to the predriver; and a logic gate that is coupled to the delay circuit, the reflection cancellation predriver and the sampling circuit.

In accordance with an embodiment of the present invention, the sampling circuit further comprises: a switch that is coupled between the differential amplifier and the ADC; and a capacitor that is coupled to the switch and the ADC.

In accordance with an embodiment of the present invention, the sampling circuit further comprises: a third adjustable current source; and a capacitor that is coupled to the fifth adjustable current source.

In accordance with an embodiment of the present invention, the measuring circuit further comprises a comparator that is coupled between the differential amplifier and the fifth adjustable current source.

In accordance with an embodiment of the present invention, a method is provided. The method comprises setting a delay to a predetermined minimum; transmitting an input pulse across a transmission line; applying a compensation current after the delay; digitizing a reflection from the transmission line to generate a measurement; determining from the measurement whether the compensation current substantially compensates for the reflection; and if the compensation current does not substantially compensates for the reflection, then adjusting the delay and repeating the steps of setting, transmitting, applying, sampling, and determining until the compensation current substantially compensates for the reflection.

In accordance with an embodiment of the present invention, the method further comprises setting a timing circuit to the delay that substantially compensates for the reflection current received by the transmission terminal.

In accordance with an embodiment of the present invention, the transmission line further comprises a first transmission line and a second transmission line.

In accordance with an embodiment of the present invention, the step of digitizing further comprises: amplifying the voltage difference between the first and second transmission lines; and sampling the amplified voltage difference at a sampling instant.

In accordance with an embodiment of the present invention, the step of sampling further comprises sampling at a plurality of sampling instants.

In accordance with an embodiment of the present invention, an apparatus is provided. The apparatus comprises a magnetic head; an interconnect that is coupled to the magnetic head; a write driver having: a predriver; a first transmission terminal that is coupled to the interconnect and to the predriver; a second transmission terminal that is coupled to the interconnect and to the predriver; a first adjustable current source that is coupled to the first transmission terminal; a second adjustable current source that is coupled the first transmission terminal; a third adjustable current source that is coupled to the second transmission terminal; a fourth adjustable current source that is coupled the second transmission terminal, wherein the first, second, third, and fourth adjustable current sources are controlled by the predriver; a reflection cancellation driver that is coupled to the transmission terminal, wherein the reflection cancellation driver injects a current at a delay; and a reflection sensor that is coupled to the transmission terminal, wherein, in a calibration mode, the predriver iteratively adjusts the delay to determine a compensation delay, wherein the current provided at the compensation delay substantially compensates for a reflection current received by the first and second transmission terminals.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
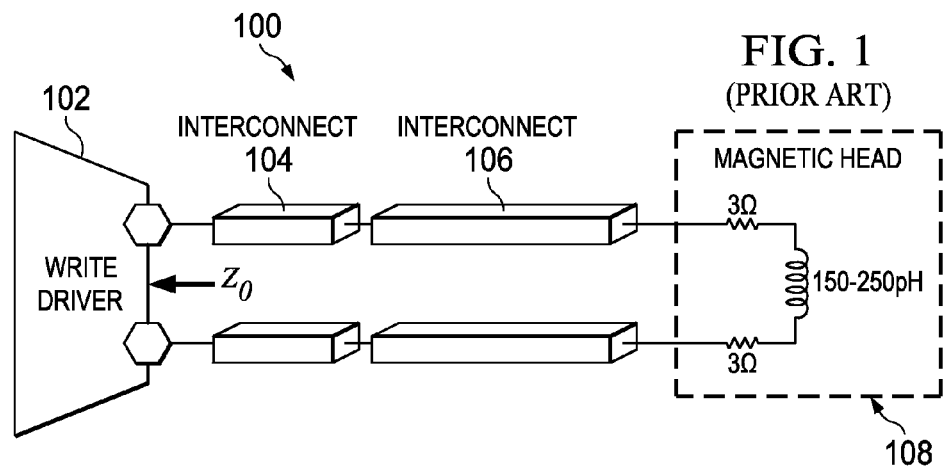
FIG. 1 is a diagram of an example of a conventional system.
Figure 2:
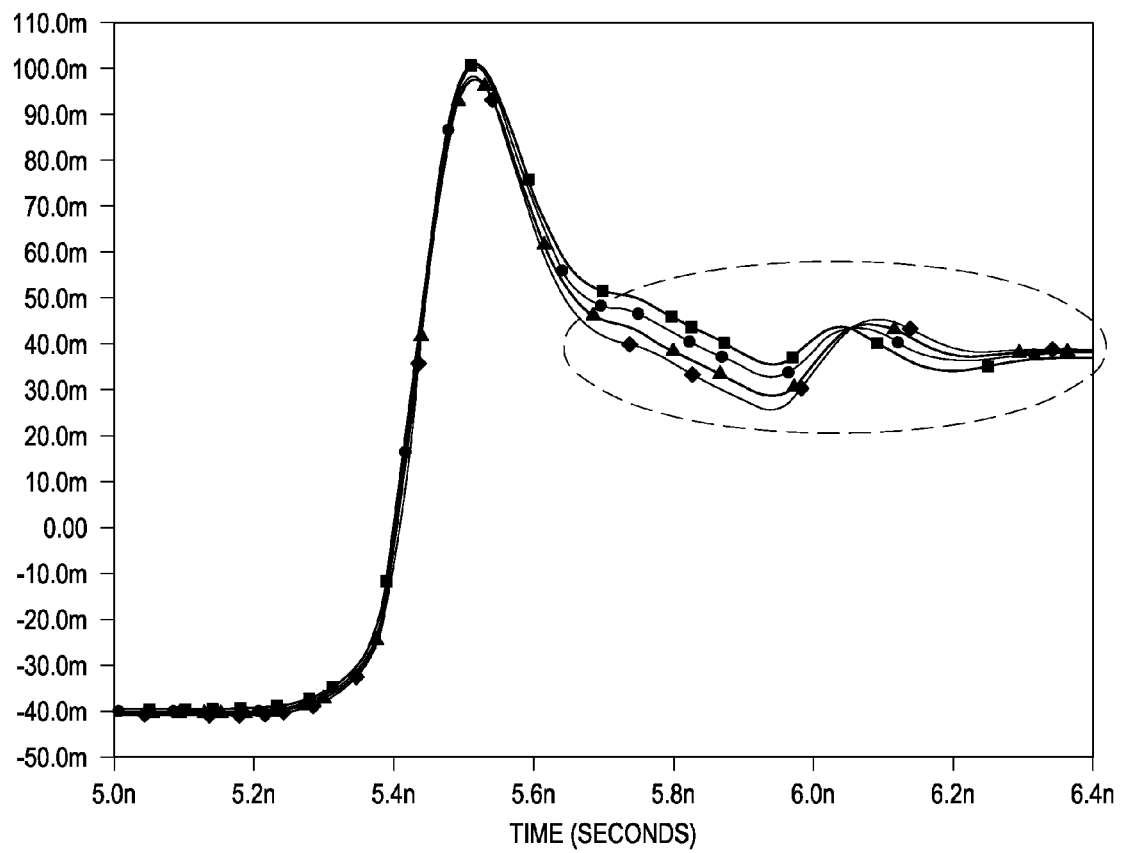
FIG. 2 is a diagram depicting a interference from a reflection current with the system of FIG. 1.

Refer now to the drawings wherein depicted elements are, for the sake of clarity, not necessarily shown to scale and wherein like or similar elements are designated by the same reference numeral through the several views.

Figure 3:
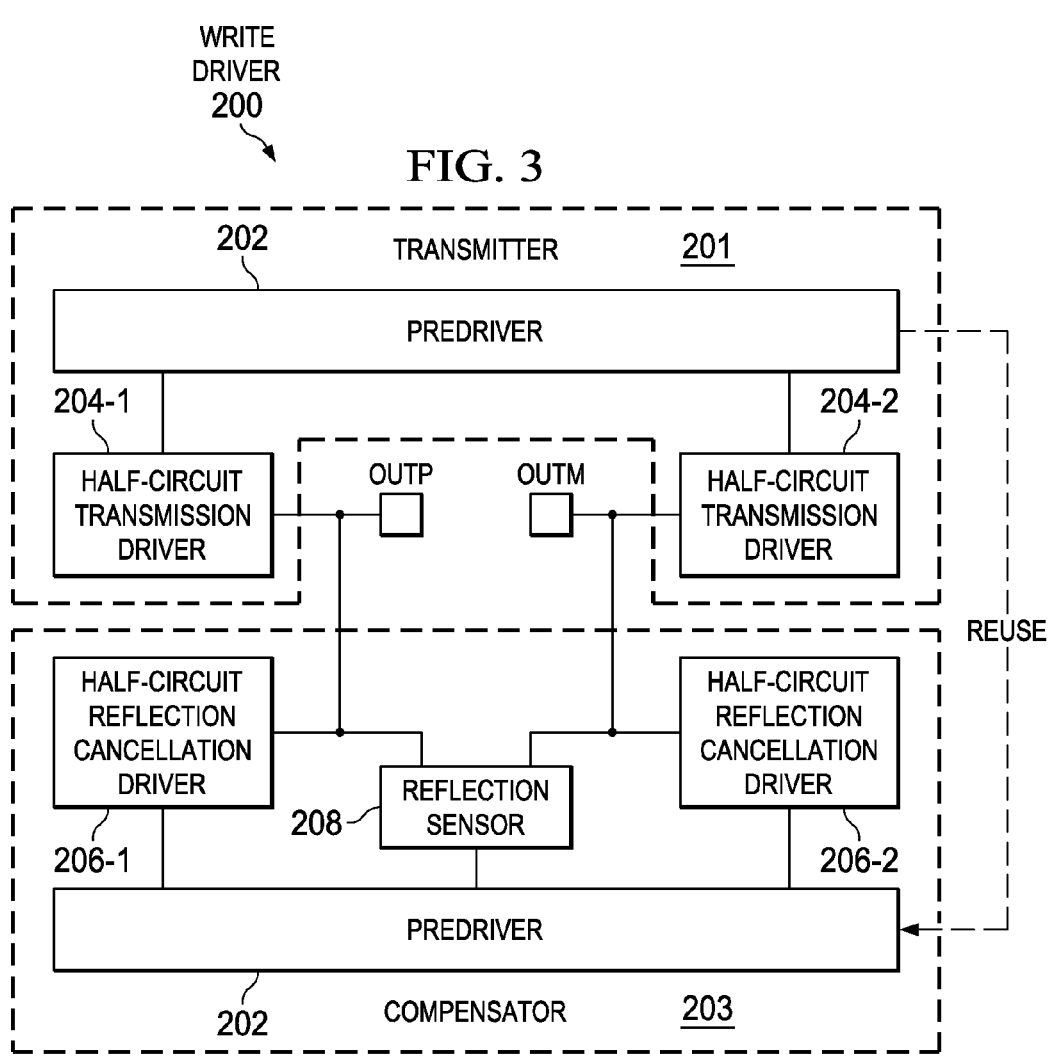
FIG. 3 is a diagram of an example of a write driver in accordance with an embodiment of the present invention.
Figure 4:
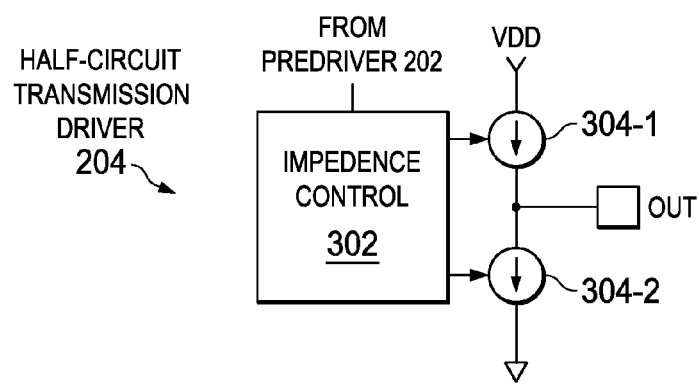
FIG. 4 is a diagram of a half-circuit transmission driver of FIG. 3.
Figure 5:
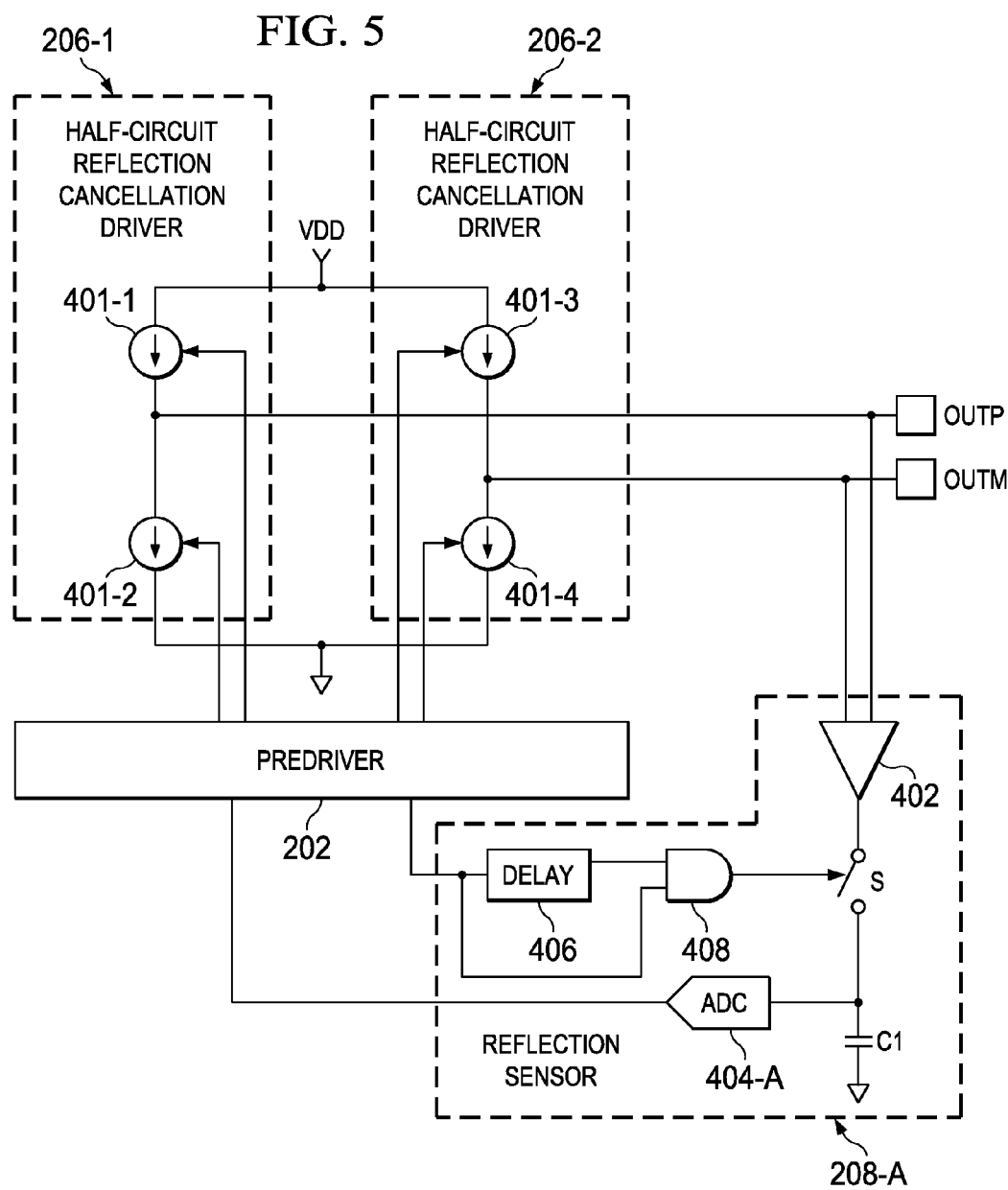
FIGS. 5-7 are diagrams of examples of the compensator of FIG. 3.
Figure 6:
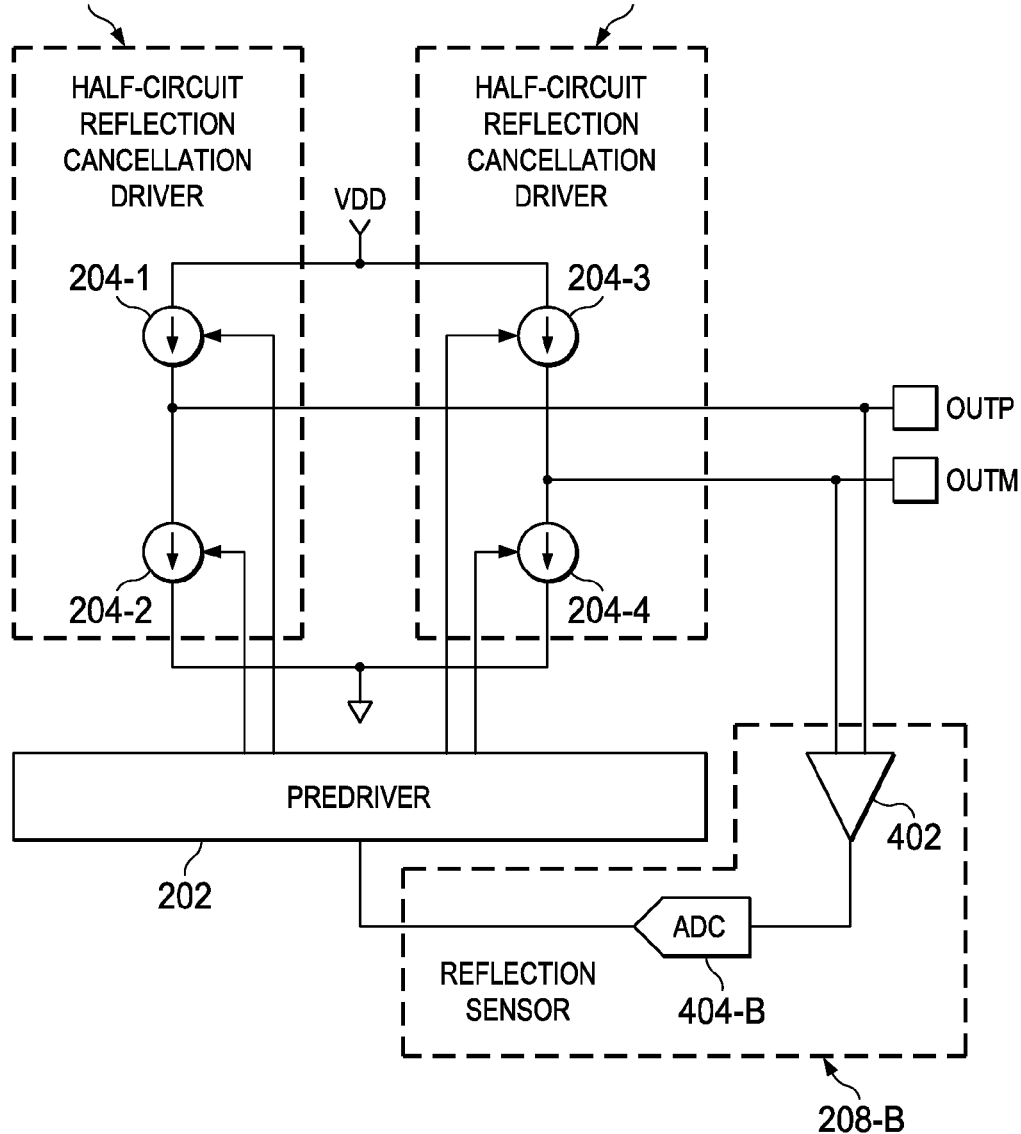
Figure 7:
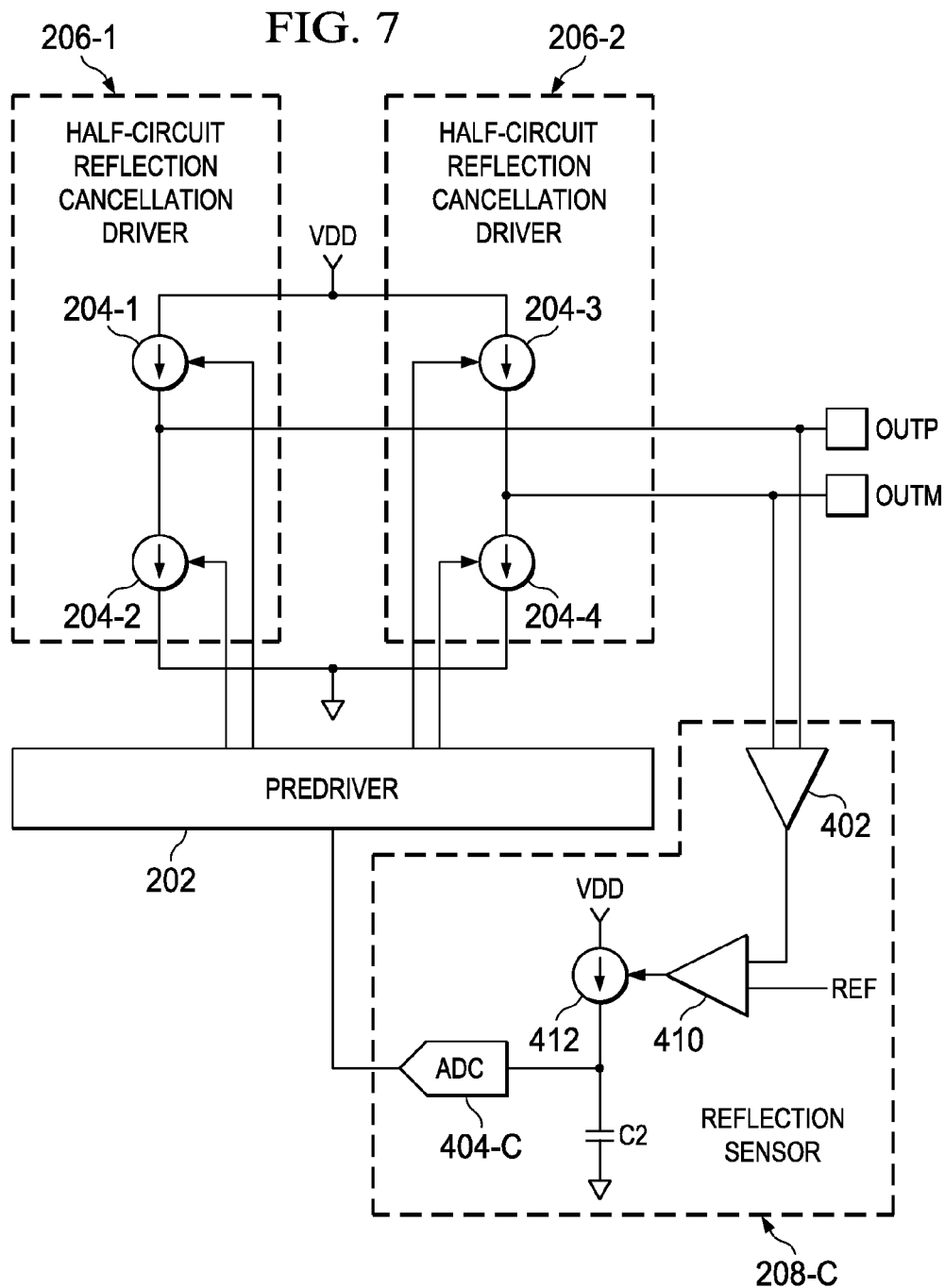

Turning to FIG. 3, an example of a write driver 200 in accordance with an embodiment of the present invention can be seen. As shown, the write driver 200 generally comprises a transmitter 201 and a compensator 203. The transmitter 201 generates a shaped current (which indicates write) through the use of predriver 202 (which functions as the transmission predriver) and half-circuit transmission drivers 204-1 and 204-2. Each of these transmission drivers 204-1 and 204-2 forms one-half of an H-bridge and can be represented as an impedance control 302 and adjustable current sources 304-1 and 304-2 (as shown in FIG. 4, where the transmission drivers 204-1 and 204-2 are labeled 204). In contrast to the transmitter 201, the compensator 203 is able to measure and compensate for reflections (which primarily, but not necessarily, in interconnects 104 and 106); this is generally accomplished through the reuse of predriver 202 as a reflection cancellation predriver. In addition to reusing the predriver 202, the compensator 203 is also generally comprised of half-circuit reflection cancellation drivers 206-1 and 206-2, and a reflection sensor 208. Similar to transmission drivers 204-1 and 204-2, the reflection cancellation drivers 206-1 and 206-2 generally form an H-bridge, which can be represented by adjustable current sources 401-1 to 401-4 as shown in FIGS. 5-7. Impedance control for these adjustable current sources 401-1 to 401-4 can then be provided by the predriver 202.

Typically, the write driver 200 has two modes: calibration and operational. During the calibration mode, the predriver 202 is able to determine a calibration delay. Preferably, the predriver 202 will set a delay for transmitting a cancellation current to a predetermined minimum (i.e., 10 ps). A write signal will then be transmitted followed by a cancellation current (which can also be a shaped current pulse) after the delay has lapsed. The reflection sensor 208 measures and digitizes the reflection so that the predriver 202 can determine whether the delay is sufficient to operate as a compensation delay (i.e., compensating for the reflection current). If not, the delay is iteratively increased (i.e., increase 10 ps with each iteration) until the compensation delay is determined. Once this compensation delay has been determined, the write driver 200 can operate in the operational mode, where the predriver 202 and transmission drivers 204-1 and 204-2 generate the current shaped write signal. In this operational mode, the compensation delay and correction current can be included by adjusting of the pulse width modulation (PWM) signals used to control the transmission drivers 204-1 and 204-2.

When implementing the reflection sensor there are several arrangements. In FIG. 5, reflection sensor 208-A generally comprises a differential amplifier 402, a sampling circuit (which is generally a sample-and-hold circuit that includes switch S and capacitor C1), an analog-to-digital converter (ADC) 404-A, and logic (which generally includes delay circuit 406 and AND gate 408). For this arrangement, the ADC 404-A can, for example, be a successive approximation register (SAR) ADC that is included within predriver 202. The logic (i.e., delay circuit 406 and AND gate 408) generate a sample signal that allows for multiple measurements or sampling instants (i.e., separated by 10 ps). For this arrangement, the differential amplifier 402 provides a current amplitude, and the ADC 404-A (which can be a slow SAR ADC) digitizes this output.

Turning to FIGS. 6 and 7, other example implementations for the reflection sensor 208 (which are labeled 208-B and 208-C) can be seen. For reflection sensor 208-B, ADC 208-B is generally the read channel ADC (which can be part of the read channel) or predriver ADC (which can be part of the predriver 202), which can digitize the current amplitude from differential amplifier 402. With reflection sensor 208-C, a comparator 410 compares the current amplitude from differential amplifier 402 with a reference voltage REF (which is generally controlled by the predriver 202). The output of comparator 410 is used to control adjustable current source 412 (which together with capacitor C2 form a sampling circuit). ADC 404-C can then digitize this sampled signal for predriver 202.

Figure 8:
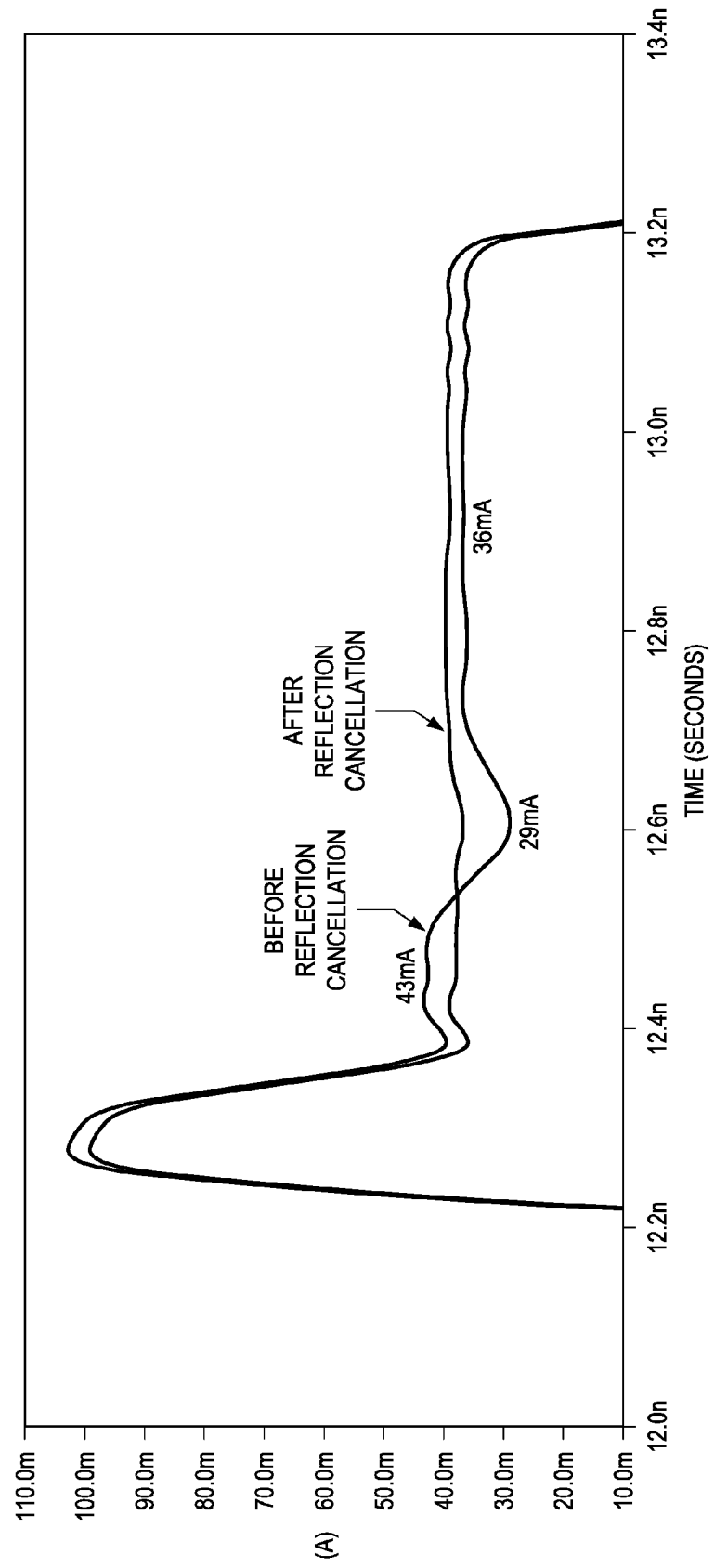
FIG. 8 is a diagram comparing the system of FIG. 1 employing the conventional write driver and the write driver of FIG. 3.

In FIG. 8, a comparison of the performances of the drivers 100 and 200 can be seen. As a result of using this compensator 203, the performance of the write driver 200 is improved over write driver 100. Moreover, the write driver 200 is able to dynamically adapt to it environment and can compensate for changes over time.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
a transmission terminal;
a transmitter that is coupled to the transmission terminal; and
a compensator having:
a reflection cancellation driver that is coupled to the transmission terminal, wherein the reflection cancellation driver injects a current at a delay;
a reflection sensor that is coupled to the transmission terminal;
a predriver that is coupled to the reflection cancellation driver and the reflection sensor, wherein, in a calibration mode, the reflection cancellation predriver iteratively adjusts the delay to determine a compensation delay, wherein the current provided at the compensation delay substantially compensates for a reflection current received by the transmission terminal;
wherein the transmitter further comprises:
the predriver; and
a transmission driver that is coupled between the predriver and the transmission terminal;
wherein the reflection cancellation circuit further comprises:
a first adjustable current source that is coupled to the transmission terminal; and
a second adjustable current source that is coupled the transmission terminal, wherein the first and second adjustable current sources are controlled by the predriver;
wherein the transmission terminal further comprises a first transmission terminal and a second transmission terminal, and wherein the transmission driver further comprises a first transmission driver that is coupled to the first transmission terminal and a second transmission driver that is coupled to the second transmission terminal, and wherein the reflection cancellation circuit further comprises a first reflection cancellation circuit that is coupled to the first transmission terminal and a second reflection cancellation circuit that is coupled to the second transmission terminal;
wherein the reflection sensor further comprises:
a differential amplifier that is coupled across the first and second transmission terminals; and
an analog-to-digital converter (ADC) that is coupled between the differential amplifier and the predriver;
wherein the reflection sensor further comprises a sampling circuit that is coupled to between differential amplifier and the ADC;
wherein the reflection sensor further comprises logic that is coupled between the predriver and the sampling circuit;
wherein the logic further comprises:
a delay circuit that is coupled to the predriver; and
a logic gate that is coupled to the delay circuit, the reflection cancellation predriver and the sampling circuit;
wherein the sampling circuit further comprises:
a switch that is coupled between the differential amplifier and the ADC; and
a capacitor that is coupled to the switch and the ADC.

2. An apparatus comprising:
a transmission terminal;
a transmitter that is coupled to the transmission terminal; and
a compensator having:
a reflection cancellation driver that is coupled to the transmission terminal, wherein the reflection cancellation driver injects a current at a delay;
a reflection sensor that is coupled to the transmission terminal;
a predriver that is coupled to the reflection cancellation driver and the reflection sensor, wherein, in a calibration mode, the reflection cancellation predriver iteratively adjusts the delay to determine a compensation delay, wherein the current provided at the compensation delay substantially compensates for a reflection current received by the transmission terminal;
wherein the transmitter further comprises:
the predriver; and
a transmission driver that is coupled between the predriver and the transmission terminal;
wherein the reflection cancellation circuit further comprises:
a first adjustable current source that is coupled to the transmission terminal; and
a second adjustable current source that is coupled the transmission terminal, wherein the first and second adjustable current sources are controlled by the predriver;
wherein the transmission terminal further comprises a first transmission terminal and a second transmission terminal, and wherein the transmission driver further comprises a first transmission driver that is coupled to the first transmission terminal and a second transmission driver that is coupled to the second transmission terminal, and wherein the reflection cancellation circuit further comprises a first reflection cancellation circuit that is coupled to the first transmission terminal and a second reflection cancellation circuit that is coupled to the second transmission terminal;
wherein the reflection sensor further comprises:
a differential amplifier that is coupled across the first and second transmission terminals; and
an analog-to-digital converter (ADC) that is coupled between the differential amplifier and the predriver;
wherein the reflection sensor further comprises a sampling circuit that is coupled to between differential amplifier and the ADC;
a third adjustable current source; and
a capacitor that is coupled to the fifth adjustable current source.

3. The apparatus of claim 2, wherein the measuring circuit further comprises a comparator that is coupled between the differential amplifier and the fifth adjustable current source.

4. An apparatus comprising:
a magnetic head;
an interconnect that is coupled to the magnetic head;
a write driver having:
a predriver;
a first transmission terminal that is coupled to the interconnect and to the predriver;
a second transmission terminal that is coupled to the interconnect and to the predriver;
a first adjustable current source that is coupled to the first transmission terminal;
a second adjustable current source that is coupled the first transmission terminal;

a third adjustable current source that is coupled to the second transmission terminal;

a fourth adjustable current source that is coupled the second transmission terminal, wherein the first, second, third, and fourth adjustable current sources are controlled by the predriver;

a reflection cancellation driver that is coupled to the transmission terminal, wherein the reflection cancellation driver injects a current at a delay; and a reflection sensor that is coupled to the transmission terminal, wherein, in a calibration mode, the predriver iteratively adjusts the delay to determine a compensation delay, wherein the current provided at the compensation delay substantially compensates for a reflection current received by the first and second transmission terminals;

wherein the reflection sensor further comprises:
   a differential amplifier that is coupled across the first and second transmission terminals; and
   an ADC that is coupled between the differential amplifier and the predriver;

wherein the reflection sensor further comprises a sampling circuit that is coupled to between differential amplifier and the ADC;

wherein the reflection sensor further comprises logic that is coupled between the predriver and the sampling circuit;

wherein the logic further comprises:
   a delay circuit that is coupled to the predriver; and
   a logic gate that is coupled to the delay circuit, the predriver and the sampling circuit;

wherein the sampling circuit further comprises:
   a switch that is coupled between the differential amplifier and the ADC; and
   a capacitor that is coupled to the switch and the ADC.

5. An apparatus comprising:
a magnetic head;
an interconnect that is coupled to the magnetic head;
a write driver having:
   a predriver;
   a first transmission terminal that is coupled to the interconnect and to the predriver;
   a second transmission terminal that is coupled to the interconnect and to the predriver;
   a first adjustable current source that is coupled to the first transmission terminal;
   a second adjustable current source that is coupled the first transmission terminal;
   a third adjustable current source that is coupled to the second transmission terminal;
   a fourth adjustable current source that is coupled the second transmission terminal, wherein the first, second, third, and fourth adjustable current sources are controlled by the predriver;
   a reflection cancellation driver that is coupled to the transmission terminal, wherein the reflection cancellation driver injects a current at a delay; and
   a reflection sensor that is coupled to the transmission terminal, wherein, in a calibration mode, the predriver iteratively adjusts the delay to determine a compensation delay, wherein the current provided at the compensation delay substantially compensates for a reflection current received by the first and second transmission terminals;

wherein the reflection sensor further comprises:
   a differential amplifier that is coupled across the first and second transmission terminals; and
   an ADC that is coupled between the differential amplifier and the predriver;

wherein the reflection sensor further comprises a sampling circuit that is coupled to between differential amplifier and the ADC;

wherein the sampling circuit further comprises:
   a third adjustable current source; and
   a capacitor that is coupled to the fifth adjustable current source.

6. The apparatus of claim 5, wherein the measuring circuit further comprises a comparator that is coupled between the differential amplifier and the third adjustable current source.

* * * * *